United States Patent [19]
Favreau

[11] Patent Number: 4,635,105
[45] Date of Patent: Jan. 6, 1987

[54] LARGE SCREEN VIDEO DISPLAY COMPRISING A MATRIX ARRAY OF CATHODE-RAY TUBES OPERATED AT INCREASED VERTICAL AND HORIZONTAL SCAN RATES

[75] Inventor: Michel Favreau, Neuilly, France

[73] Assignee: Thomson CSF, Paris, France

[21] Appl. No.: 629,974

[22] Filed: Jul. 11, 1984

[30] Foreign Application Priority Data

Jul. 22, 1983 [FR] France .................. 83 12175

[51] Int. Cl.[4] .......... H04N 9/24; H04N 9/16; H04N 5/68; H01Q 1/00
[52] U.S. Cl. .................. 358/67; 358/56; 358/64; 358/66; 358/230; 358/242; 340/720; 340/752; 340/766
[58] Field of Search ............ 358/56, 60, 64, 230, 358/231, 237, 242, 250, 66, 67; 340/720, 752, 766

[56] References Cited

U.S. PATENT DOCUMENTS

| | | | |
|---|---|---|---|
| 3,525,800 | 8/1970 | Wilcox | 358/65 |
| 3,909,525 | 9/1975 | Fagan | 358/250 |
| 4,305,092 | 12/1981 | Katzfey | 358/60 |
| 4,368,485 | 1/1983 | Midland | 358/64 |

FOREIGN PATENT DOCUMENTS

| | | | |
|---|---|---|---|
| 39437 | 3/1980 | Japan | 358/250 |
| 1021024 | 5/1983 | U.S.S.R. | 358/242 |

OTHER PUBLICATIONS

Weingärtner, I., et al., "Chromatic Correction of Two- and Three-Element Holographic Imaging Systems", OPTICA ACTA, 1982, vol. 29, No. 4, pp. 519-529.

Primary Examiner—Michael A. Masinick
Assistant Examiner—Randall S. Svihla
Attorney, Agent, or Firm—Cushman, Darby & Cushman

[57] ABSTRACT

In an embodiment, the device comprises ten rows of ten cathode-ray tubes, each tube being associated with a convergent lens. Each cathode-ray tube reproduces a picture portion and the lens enlarges this picture portion in such a ratio that the joints between the cathode-ray tubes no longer appear. The cathode-ray tubes incorporate a single electron gun, two pairs of electrostatic deflection plates and a screen incorporating red, green and blue phosphors and ultraviolet indexing phosphors. The display device is connected to an electronic device which supplies scan signals for each cathode-ray tube and which supplies color signals. The horizontal-scan frequency and vertical-scan frequency are ten times higher than for a conventional television display. The electronic device possesses memories which store the color information corresponding to each of the picture portions.

6 Claims, 8 Drawing Figures

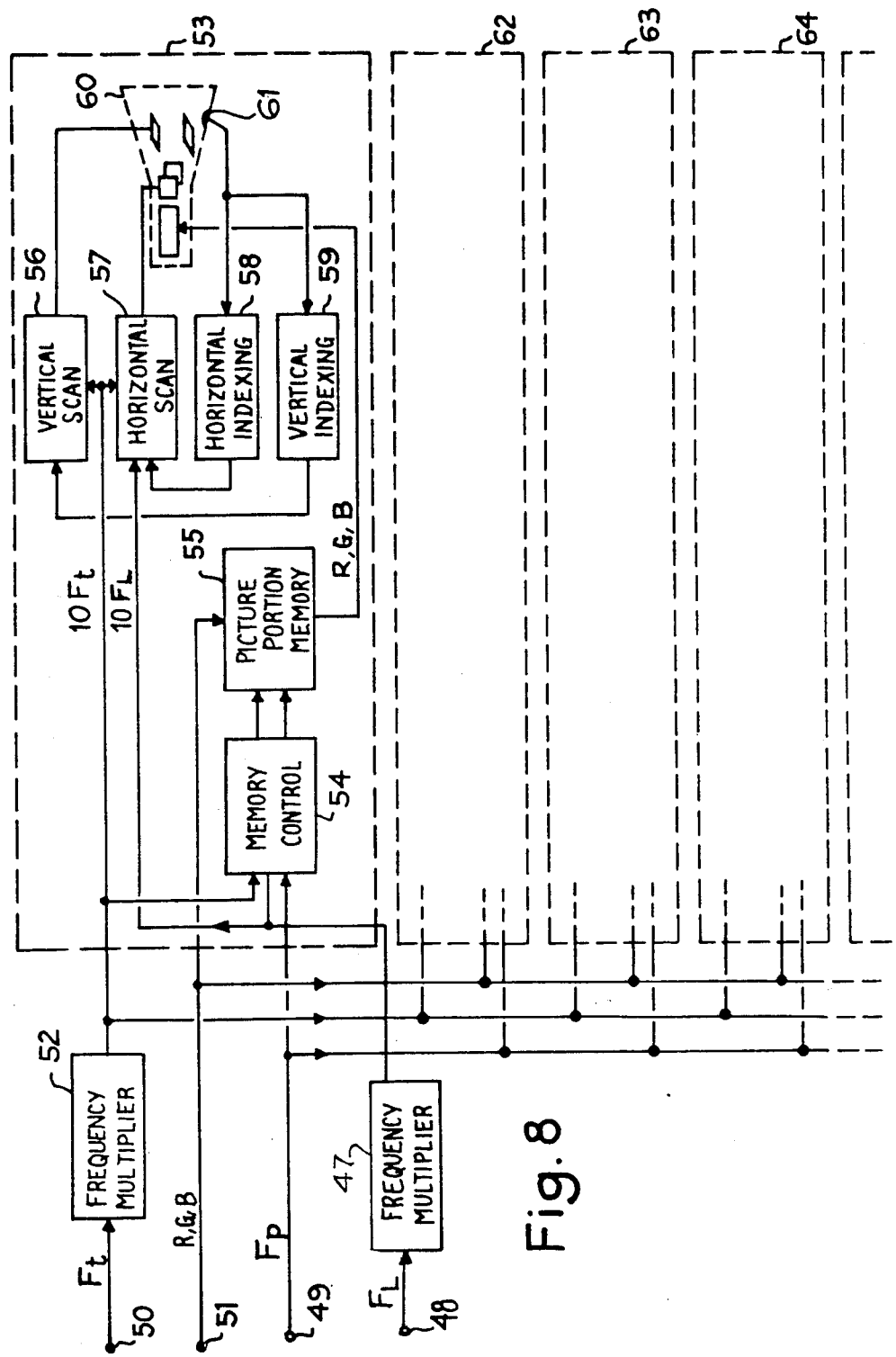

LARGE SCREEN VIDEO DISPLAY COMPRISING A MATRIX ARRAY OF CATHODE-RAY TUBES OPERATED AT INCREASED VERTICAL AND HORIZONTAL SCAN RATES

BACKGROUND OF THE INVENTION

The invention relates to the devices which make it possible to display a television picture on a large screen and applies to television monitors and receivers.

Many devices of this type have been produced, but the results obtained hereto are not entirely satisfactory. There are, in particular, known projectors which comprise three cathode-ray tubes and an optical device projecting and superimposing on a diffusing screen three images supplied by these three cathode-ray tubes. This type of device is relatively economical, but has a low level of brightness, and it gives a picture of inferior quality as compared to that of a cathode-ray tube with a mask, conventionally used for pictures having a diagonal less than 80 cm. Its luminous efficiency is poor because of the small aperture of the optical projection device, and the contrast obtained is low as a result of the scattering caused by the optical device and by the cathode-ray screens themselves, because they have to supply a very high candle power. There are also known projection devices making use of light valves which give good results, but are difficult to use and are relatively expensive. There are also known projection devices utilizing laser beams, but their luminous efficiency is extremely low.

Another solution is to construct a display device with direct vision, but with very large dimensions. Large-size cathode-ray tubes have been constructed, but enormous technological difficulties arise in producing them on an industrial scale, when the screen diagonal exceeds 80 cm, and on the other hand the depth of the tube results in a considerable bulk. To avoid these disadvantages, it is known to use electron beams guided in rows and columns by electrodes of suitable shapes, but this solution appears difficult to put into practice on an industrial scale at the present time.

On the other hand, devices utilizing plasmas as electron sources to excite phosphors are now being studied. This process presents numerous problems: each element of the device must be controlled by a constant voltage which is pulse-length modulated; the constrast obtained is low (20:1); the candle power is approximately 5 times less than that of a conventional cathode-ray tube.

U.S. Pat. No. 4,368,485 describes a television-picture display device consisting of a plurality of small cathode-ray tubes of square shape which are placed next to one another to form a matrix. Each tube reproduces only 4 picture elements, thus making it possible to make the spaces attributed to the joints between the tubes unnoticeable, but the number of tubes, frame-deflecting coils and multiplexing circuits is extremely high. The complexity of this device results in a very high cost.

U.S. Pat. No. 3,909,525 describes a display device comprising a plurality of conventional trichromic cathode-ray tubes placed next to one another to form a matrix, each cathode-ray tube reproducing a rectangular position of the picture to be displayed and being associated with an optical device which enlarges this picture portion in such a ratio that the enlarged picture portions appear contiguous in spite of the space occupied by the joints between the tubes. This document does not describe means for supplying each tube with the video signals and scan signals necessary to display on each of them a specific portion of the picture to be displayed.

A device which is simple to produce can consist of conventional monitors, buffer memories and control means for controling reading and writing in these memories and synchronizing the scans of the monitors. A conventional monitor operating according to European standards executes a scan of 312.5 lines per field in 20 ms. For example, a complete picture comprising 625 lines can be reproduced on a matrix of $10 \times 10$ monitors, each monitor reproducing 62 picture lines, each picture line being reproduced by 10 scan lines of the monitor, the corresponding information being read 10 times from a buffer memory associated with the considered monitor.

The information corresponding to the bottom of a field is available only 20 ms after the start of analysis of this field. On the other hand, each picture portion requires 20 ms to be displayed, since the monitors are assumed to have a standard scan. In particular, the last picture portion located in the lower right-hand corner is displayed completely after a period of 20 ms in relation to the start of display of this picture portion, this start being delayed $9 \times 62$ lines $+9$ lines in relation to the moment when the picture begins to be displayed in the upper left-hand corner of the screen. The sum of these two delays is practically equal to 40 ms. The replacement of one picture by another therefore lasts 40 ms instead of the usual 20 ms.

When a sequence of fields represents objects moving at high speed, this period in which the displayed picture is renewed is very disturbing, since the eye perceives a delay between the changes in the top of the picture and those in the bottom of the picture. This simple device is therefore unsuitable for pictures with motion images. On the other hand, the brightness of the cathode-ray tubes is often insufficient for use in the open air, the more because it is reduced as a result of the optical device. This brightness is limited by a saturation of phosphors of the screen of the tubes, this saturation depending on the energy of the electron beam and its scanning speed.

The device according to the invention avoids these disadvantages, while at the same time making use of conventional techniques.

SUMMARY OF THE INVENTION

According to the invention, a device for displaying a large-size television picture comprises a plurality of cathode-ray tubes placed next to one another to form a matrix of N rows and M columns (N and M being integers greater than 1) each cathode-ray tube contains at least one electron beam which displays on a luminescent screen a rectangular portion of the picture to be displayed. Optical devices are located respectively opposite the screens and associated with each picture portion so as to enlarge it in such a ratio that the enlarged picture portions appear contiguous in spite of the joints between the tubes. Memories, called picture-portion memories, are each associated respectively with a cathode-ray tube, for storing the information corresponding to the picture portion displayed on the cathode-ray tube. A means of controlling the memories and a scanning means are provided to display each picture portion with a vertical scan having a period at least N times less than the period of the vertical analysis scan.

The device according to the invention therefore comprises a first part consisting of cathode-ray tubes and optical devices and a second part consisting of electronic circuits.

The invention will be understood better and other details will emerge with the aid of the following description and the Figures accompanying it:

BRIEF DESCRIPTION OF THE DRAWINGS

FIG. 8 shows the block diagram of an exemplary embodiment of the second part of the device according to the invention.

DETAILED DESCRIPTION OF THE PREFERRED EMBODIMENTS

Figure 1:
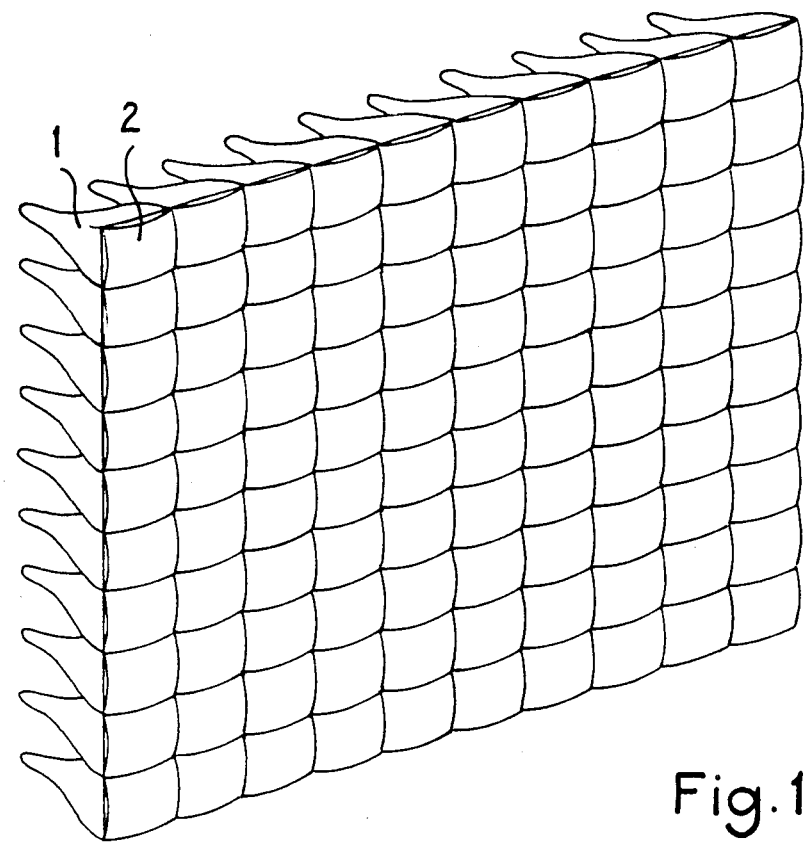
FIG. 1 shows a first exemplary embodiment of the first part of the device according to the invention.

The exemplary embodiment illustrated in FIG. 1 comprises 100 cathode-ray tubes placed next to one another to form a 10×10 matrix. Each cathode-ray tube 1 comprises a rectangular screen in front of which is located an optical device 2 which transmits and enlarges the picture supplied by the screen. This picture is a fraction of the picture to be reproduced on the device as a whole. The screen of each cathode-ray tube 1 has a length and a width in a ratio of 2:3 to obtain on the device as a whole a picture which has a length and width in a ratio of 2:3.

According to a first alternative embodiment, each cathode-ray tube 1 is independent of those adjacent to it, and each optical device 2 is independent of those adjacent to it. The cathode-ray tubes 1 are tubes the bulb of which is similar to that of oscilloscope tubes with a rectangular screen.

Figure 2:
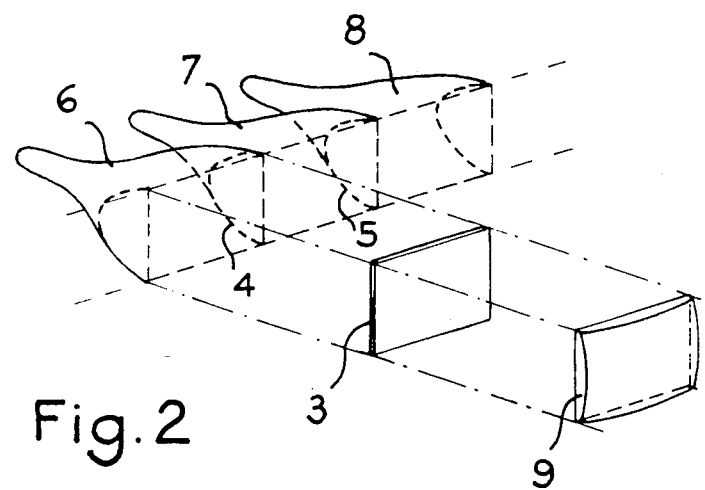
FIG. 2 shows part of this example according to a first alternative form.

According to a second alternative form, each cathode-ray tube 1 has a bulb similar to that of a cathode-ray tube for a conventional television receiver, but this bulb has undergone machining to modify its shape so as to allow the tubes to be placed more closely next to one another. FIG. 2 shows an exploded view of part of the device according to the invention, consisting of three bulbs machined on the two sides corresponding to the width of the picture, so as to cut out two plane truncations parallel to the vertical plane of symmetry of the tube. For example, the bulb 7 of the tube located in the center of the Figure has two truncations 4 and 5 which are fused to the truncations of the bulbs 6 and 8 of the adjacent tubes in the same row. The bulbs of all the tubes of a row of the matrix are thus made integral with one another. In contrast to this, the bulbs of the tubes of two consecutive rows are completely independent. The front face of each bulb is closed by a screen 3 consisting of a slab of flat glass possessing phosphors. In this example, the optical device 2 consists of a convergent thick lens 9 bonded to the outer face of the glass slab. In another exemplary embodiment, the optical device 2 can consist of a Fresnel lens, the advantage of this being that it has a smaller and relatively constant thickness and produces more diffuse reflections which make the stray reflections of the ambient light less disturbing.

Figure 3:
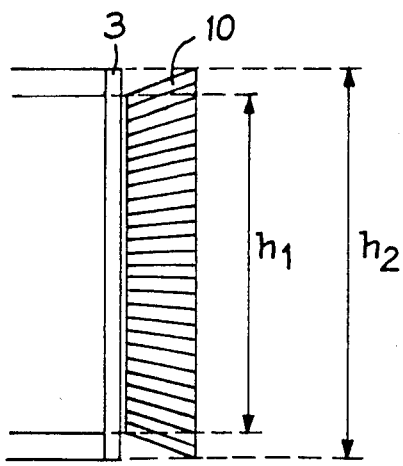
FIG. 3 shows a part of this example according to a second alternative form.

FIG. 3 shows another embodiment of the optical device 2 consisting of a slab 10 of slightly divergent optical fibers, which is such that a real picture present on the first face is transmitted to the second face with a specific enlargement identical in all the directions of the plane of the picture. For example, in FIG. 3, the picture supplied by the phosphors located on the inner face of the screen 3 has a height $h_1$. It is transmitted via the slab of optical fibers 10 and has a height $h_2$ at the exit from the slab 10, the height $h_2$ being equal to the total height of the cathode-ray tube. The picture is likewise enlarged in the horizontal direction. The picture observed therefore covers the entire surface of the front face of the cathode-ray tube, masking the edges corresponding to the walls. Such a slab of optical fibers can be manufactured according to known techniques for producing bundles of fibers enlarging a picture and for producing slabs of optical fibers without enlargement. In comparison with lenses, the advantage of slabs of optical fibers is that they make it possible for viewers to have a wider zone of good visibility and scarcely reflect the ambient light at all.

Moreover, recent developments in the sector of holographic optics make it possible to produce a polychromatic enlarging optical device by combining two or three holographic optical elements which are holographic networks or lenses. Such a device is described in Optica Acta of 1982, volume 29, No. 4, pages 514–529.

Figure 4:
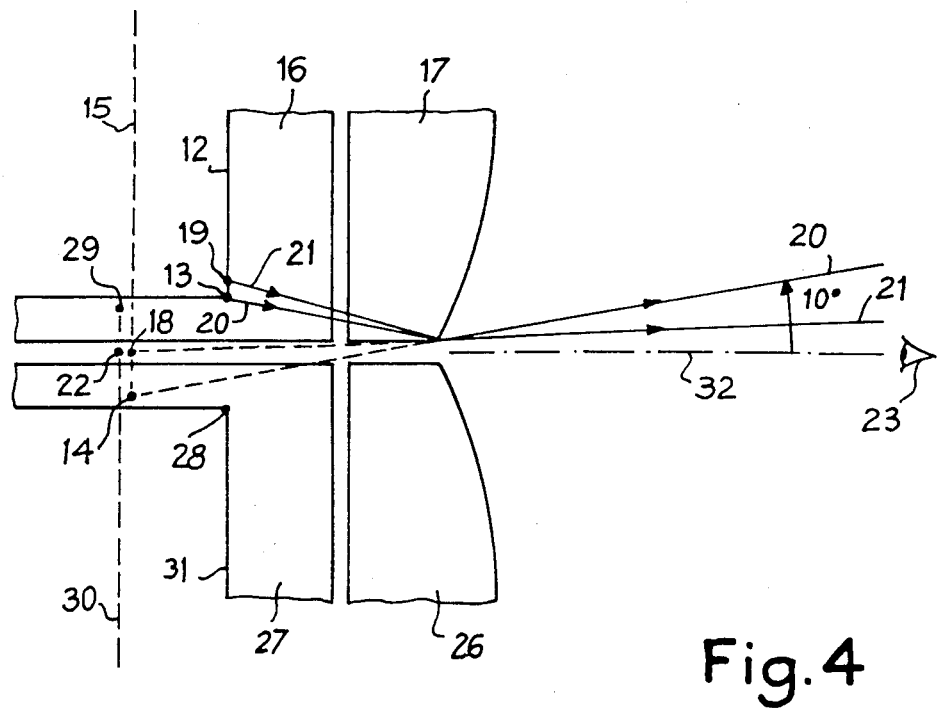
FIGS. 4 and 5 illustrate the mode of operation of the first part of the device according to the invention.

FIG. 4 illustrates the mode of operation of the optical device 2 in the exemplary embodiment in which the device 2 consists of a thick lens. This Figure shows a section through the junction between two cathode-ray tubes 16 and 27 and two thick lenses 17 and 26 bonded to the outer surface of the front face of these tubes. The electron beam of the tube 16 forms a real image 12 on the inner surface of the front face of this tube. The electron beam of the tube 27 forms a real image 31 on the inner surface of the front face of this tube. The lenses 17 and 26 supply enlarged images 15 and 30 respectively which are located in one and the same plane parallel to the plane of the images 12 and 31. The images 15 and 30 are virtual and are represented by broken lines. To indicate that they have parts which overlap one another, they are represented with a slight offset. In the real images 12 and 31, the points nearest to the boundary between the two tubes are the points 13 and 28. These points 13 and 28 emit light rays which give a virtual image 14 of the point 13 and a virtual image 29 of the point 28. The points 14 and 29 are, of course, located at the edge of the virtual images 15 and 30 respectively. The convergence of the lenses 17 and 26 is identical; it is such that the light ray 20 coming from the point 13 and passing through the edge of the lens 17 forms an angle of 10° with the plane of symmetry 32.

An observer 23 positioned exactly opposite the display device, that is to say in the plane of symmetry 32, perceives a light ray 21 which emerges from the lens 17 almost parallel to the plane 32. The observer 23 then sees a point 18 of the virtual image 15 which is the image of a point 19 which belongs to the real image 12 and which is not located at the edge of this real image 12. For reasons of symmetry, he sees a point 22 of the virtual image 30 merged with the point 18. The virtual images 15 and 30 each reproduce a portion of the picture to be displayed, reproducing the same elements of this picture in the zone where they overlap, that is to say between the points 29 and 14. In particular, the points 18 and 22 correspond to one and the same element of the picture to be displayed. However, it shall be noted that the observer 23 does not see a superimposition of the virtual images 15 and 30 in the overlap zone. In the case illustrated in FIG. 4, that is to say when the observer 23 is positioned in the plane of symmetry 32, he does not see the points located between the points 18 and 14 of the virtual image 15, and he does not see the points located between the points 22 and 29 of the virtual image 30 for reasons of symmetry. The visible parts of the virtual images 15 and 30 therefore appear contiguous at the points 18 and 22 and the displayed picture is thus reproduced without discontinuity.

When the observer moves away from the plane of symmetry 32, the part not visible at the edge of each virtual image varies. The surface of one increases, while the surface of the other decreases, since the points of the junction between these two images remain located on a straight line passing through the common edge of the lenses 17 and 26 and through the observer.

Figure 5:
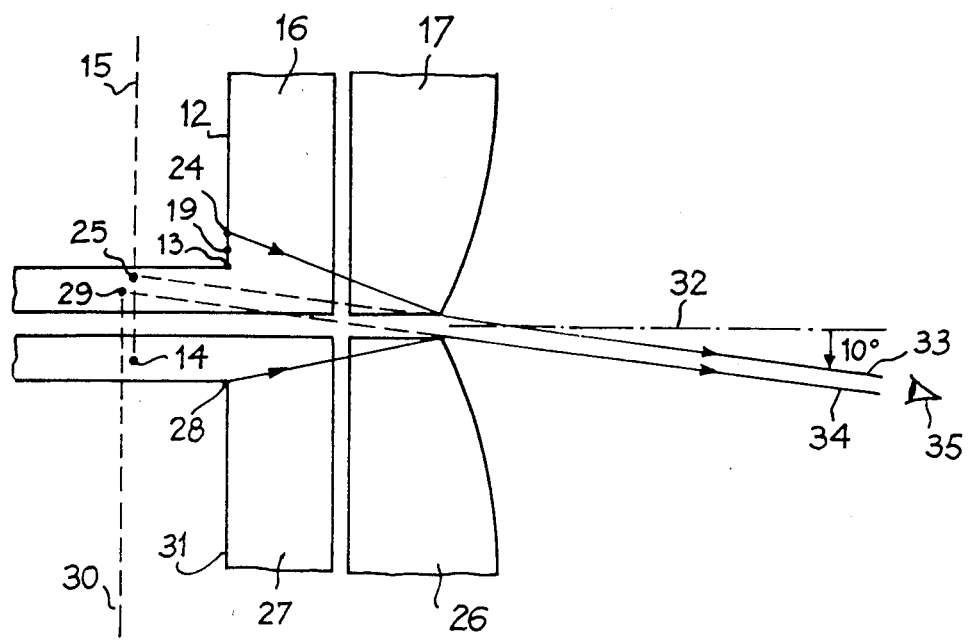

In a case considered as a limiting case, the line of sight of an observer forms an angle of 10° with the plane of symmetry 32. This case is illustrated in FIG. 5. Here, the observer 35 perceives a light ray 33 coming from a point 25 of the virtual image 15 which is the image of a point 24 belonging to the real image 12 and not located on the edge of the latter. The observer also perceives a ray 34 which appears to come from the point 29 of the virtual image 30, but which is emitted by the point 28 located at the edge of the real image 31, since the convergence of the lenses 17 and 26 is such that a ray emitted by the point 28 and passing through the edge of the lens 26 comes from the latter at an angle of 10° relative to the plane 32, the point 13 being symmetrical to the point 28 in relation to the plane 32. The observer 35 thus sees the points 25 and 29 merged. As mentioned above, these points correspond to one and the same element of the picture to be displayed, since they belong to the overlap zone of the virtual images 15 and 30. The observer 35 sees the entire virtual image 30 up to the point 29. He therefore sees the virtual images 15 and 30 contiguous at the points 25 and 29. The points located between the points 14 and 25 of the image 15 are not visible to the observer 35, since they are masked by the joint between the tubes 16 and 27 and the joint between the lenses 17 and 26. There is, therefore, a connection between the virtual images 15 and 30, without any superimposition being visible in a doubling of the brightness.

For any viewing angle between 0 and ±10°, the junction between the visible parts of the virtual images 15 and 30 is located between the points 14 and 25 without discontinuity or overlapping. For a viewing angle greater than 10°, a discontinuity appears between the two virtual images 15 and 30.

The viewing angle is not limited to the value of ±10°. A compromise must be reached between the field of vision obtained and the difficulties involved in producing the lenses, these difficulties increasing when the magnification is increased.

Figure 6:
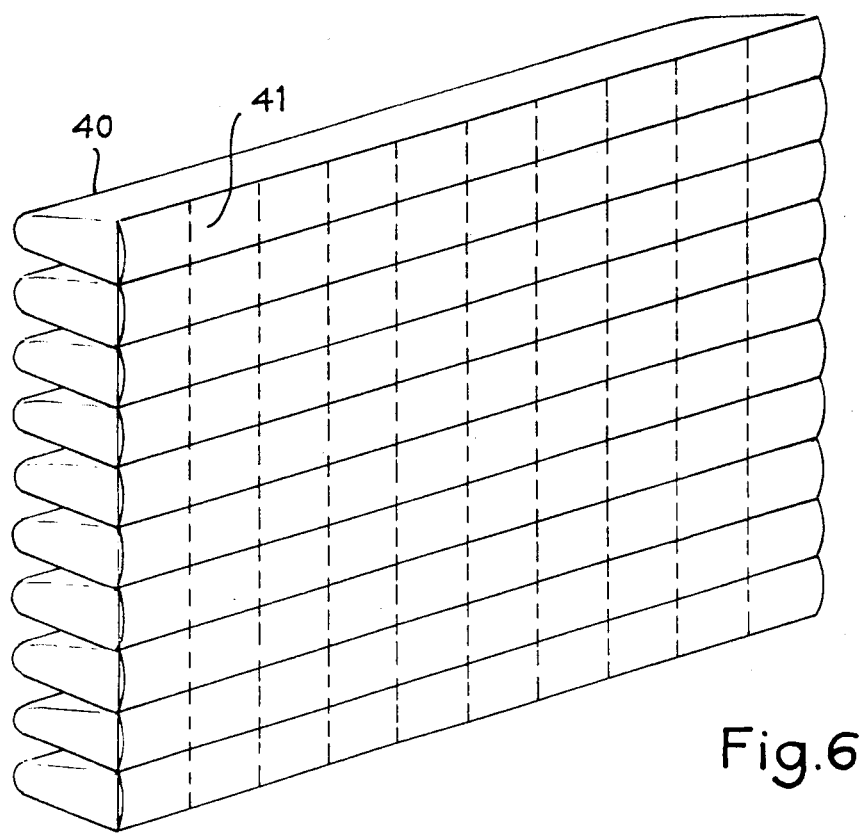
FIG. 6 shows a second exemplary embodiment of the first part of the device according to the invention.

A second embodiment of the device according to the invention is illustrated in FIG. 6. The device consists of ten linear display devices 40 which are placed next to one another, being coupled on their larger side, this larger side having the length of one line of the picture to be displayed. Each device 40 makes it possible to display ten portions of the picture to be reinserted. Each of these ten picture portions is generated by an independent electron beam and is then transmitted and enlarged by an optical device 41 which makes it possible to connect each picture portion to those supplied by the two devices 40 adjacent above and below, enlarging the picture portions perpendicularly to the joints of the device 40. On the other hand, the scan of each electron beam is adjusted so as to make the picture portions supplied by one and the same device 40 contiguous.

Figure 7:
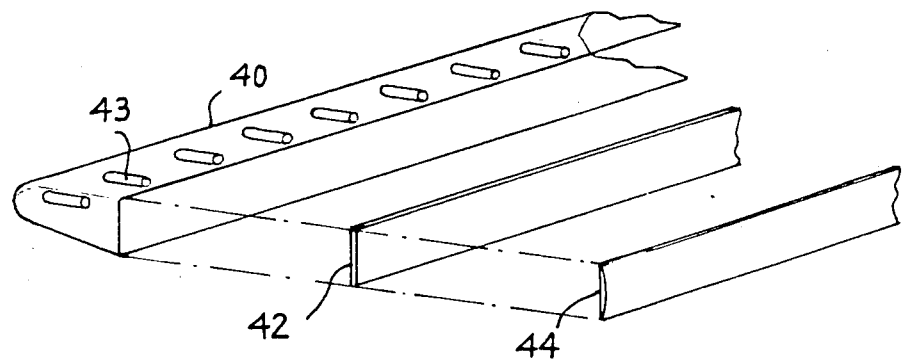
FIG. 7 shows part of this latter exemplary embodiment.

FIG. 7 illustrates an exploded view of a device 40 and the optical device 41 associated with it. The device 40 has a gutter-shaped longitudinal section similar to the longitudinal section of the cathode-ray tube of an oscilloscope, and it contains ten electron guns 43, each comprising a pair of vertical-deflection plates and a pair of horizontal-deflection plates which are not shown. The said guns 43 are parallel to one another and are perpendicular to the front face of the device 40. The front face of the device 40 is closed by a glass slab 42 covered with phosphors for generating ten picture portions side by side. The optical device 41 consists of a convergent cylindrical lens 44, the axis of symmetry of which is parallel to the length of the device 40 and which is bonded to the outer face of the glass slab 42. The device 41 can also consist of a cylindrical Fresnel lens. The mode of operation of the optical device 41 is similar to that described above and illustrated in FIGS. 4 and 5. It makes it possible to avoid seeing the joint between two coupled devices 40. However, since the large side of each device 40 is parallel to the scan lines of the picture to be reinserted, the joints cause discontinuities between the lines of the picture when an observer is not exactly opposite the device. In practice, observers move horizontally in front of the display device, but scarcely move at all in the vertical plane, and consequently the discontinuities between the lines will not be too disturbing for observers. In this embodiment, possible discontinuities between the vertical edges of the picture portions can be caused by maladjustment of the electron beams generating these picture portions, but on the other hand there are no discontinuities attributed to the presence of two glass walls, as is the case when independent cathode-ray tubes are placed next to one another. These discontinuities can therefore easily be eliminated by an accurate adjustment of the scans, particularly by providing strips of indexing phosphors on the inner face of the slab 42.

FIG. 8 illustrates the block diagram of an exemplary embodiment of the second part of the display device according to the invention. This example comprises 100 electron beams forming 100 picture portions, each picture portion being generated by an electronic device, such as the device 53 shown in FIG. 8. In FIG. 8, the other electronic devices 62, 63, 64 etc., are not shown in detail, since they are identical to the device 53. Each picture is reconstituted by means of a matrix of 10×10 rectangular picture portions.

It is necessary to make a clear distinction between the lines of the analysis scan and the lines of the display scan: the analysis scan comprises two fields of 312.5 lines of 64 microseconds and the display scan consists of two fields of 312.5 lines of 6.4 microseconds for each picture portion. The period of the analysis fields is 20 ms, whereas the period of the display fields is 2 ms. Thus, each point of the analyzed picture is displayed by means of 10×10 points of a picture portion which have the same values R, G, B. Each cathode-ray tube is therefore scanned by 312.5 lines every 2 ms, that is to say 10 times more frequently than in a conventional monitor. 310 scan lines are used to display 31 line portions of an analyzed field, and the remaining 2.5 lines are not used.

Four input terminals 48, 49, 50 and 51 and two 10× frequency multipliers 52 and 47 are common to all these electronic devices 53, 62, 63, 64, etc. The input terminal 50 receives a synchronizing signal at the frequency $F_t$ for field analysis and supplies it to the multiplier 52 which generates a signal of frequency 10 $F_t$ corresponding to a period of 2 milliseconds. The input terminal 51 receives the numerical values R, G, B of the red, green and blue color signals. The input terminal 49 receives a clock signal at the frequency $F_p$ which is the sampling frequency of the color signals, each sample corresponding to the analysis of an image point. The input terminal 48 receives a clock signal at frequency $F_L$ for the analysis of lines, corresponding to a period of 64 microseconds. It supplies it to the frequency multiplier 47 which gives a signal of frequency 10 $F_L$, that is to say with a period of 6.4 microseconds.

The device 53 comprises a cathode-ray tube 60 with a single electron gun for the three colors, a pair of horizontal-deflection plates, a pair of vertical-deflection plates and a photocell 61 sensitive to ultraviolet radiation only, for detecting the passage of the electron beam over indexing phosphors which emit radiation in the ultraviolet range. The red, green and blue phosphors form parallel strips perpendicular to the direction of the lines and are separated by strips of ultraviolet phosphor. On the other hand, strips of ultraviolet phosphor which are parallel to the lines delimit groups of 10 lines. The device 53 also incorporates a memory 55, called a picture-portion memory, a memory control device 54, a vertical-scan device 56, a horizontal-scan device 57, a horizontal indexing device 58 and a vertical indexing device 59.

The control device 54 receives the signals of frequency $F_p$, 10 $F_t$ and 10 $F_L$ and supplies a writing address and a writing control signal to the memory 55 during certain time intervals, and it supplies a reading address and a reading control signal to the memory 55 during other time intervals. The memory 55 possesses a data input connected to the terminal 51 and a data output supplying a red, green or blue control signal to a control input of the electron gun of the tube 60. The signal applied to the electron gun is an analog signal supplied by a digital/analog converter (not shown) from digital data stored in the picture-portion memory.

The horizontal-scan device 57 possesses an input receiving the signal of frequency 10 $F_L$ and a servo-input connected to an output of the horizontal indexing device 58. The vertical-scan device 56 has a servo-input connected to an output of the vertical indexing device 59. The scan devices 56 and 57 each possess an input receiving the signal of frequency 10 $F_t$ supplied by the frequency multiplier 52, and they generate respectively a vertical scan signal and a horizontal scan signal which are applied respectively to the vertical-deflection plates and the horizontal-deflection plates of the tube 60. These signals have respectively a frequency equal to 10 times the frequency of the vertical analysis scan and 10 times the frequency of the horizontal analysis scan.

The values R, G, B of each point of the analyzed picture are stored in the memory 55 while the analysis is executed, that is to say at the frequency $F_p$, when the point in question is one of the points to be reproduced by the tube 60 in question. The device 54 counts the lines and points to determine the values to be stored. During the 64-microsecond period of each analysis line, the values to be stored correspond only to a period of 6.4 microseconds, if the line being analyzed passes through the picture portion in question. If this is not the case, there is no value to be stored in the memory 55 during the 64 microseconds.

The values R, G, B necessary for displaying each point of the displayed picture portion are read at the frequency $F_p$ in the memory 55. Each triplet makes it possible to display 10 successive points on the tube 60. The reading of a triplet R, G, B is repeated for 10 display lines, with a period of 6.4 microseconds corresponding to the frequency of the display lines, and this series of 10 readings is repeated with a period of 2 ms corresponding to the period of the display fields. Since the reading frequency and writing frequency are equal to the point analysis frequency $F_p$, it is easy to alternate the reading operations and writing operations.

The memory 55 can consist of 31 circulating memories which operate in parallel and have a number of stages equal to one tenth of the number of points analysed in each line and the inputs of which are time-multiplexed for successively storing the values R, G, B corresponding to 31 portions of successive analysis lines, and the outputs of which are multiplexed to supply 10 times the values R, G, B of a portion of a first analysis line, then 10 times the values R, G, B of a portion of a second analysis line, etc.

Each triplet of values R, G, B read in the memory 55 is used for the duration of 10 points of the display scan, and one and the same picture point is therefore displayed identically 100 times during the period of an analysis field. In comparison with a conventional display on a cathode-ray tube, scanned once only, the brightness obtained can consequently be multiplied by 100 without saturating the phosphors.

The start of storage of the values R, G, B in the memories 55 of the devices 53, 62, 63, 64 corresponding to different picture portions is staggered 6.4 microseconds in time, to take into account the relative positions of these various picture portions, but on the other hand reading in the various memories 55 can be synchronous or staggered without any disadvantage.

Since each displayed picture portion corresponds to 62 analysis lines, there is no problem as regards the sharpness of the light spot generated by the electron beam. The intensity of the beam applied at each point can therefore be much greater than in a conventional cathode-ray tube, and the brightness of the display device according to the invention is in this case limited only by the thermionic emission capacity of the cathodes.

Each tube 60 is associated with a convergent lens (not shown). There is an overlap of the virtual images supplied by two adjacent tubes and the associated lenses, to make it possible for these images to be seen to be contiguous, even if the observer has a line of sight forming an angle of ±10° relative to the perpendicular to the display device. For this purpose, each tube 60 reproduces on each edge of it picture some rows of picture points identical to those reproduced by the tube 60 adjacent to this edge. There can be, for example, 3 of these rows.

Since the period of the display fields is very short, namely 2 ms, any flickering of the picture is of course eliminated.

As an indication, the consumption of the cathodes in a device possessing 100 electron guns is 60 watts if each cathode is heated by a power of 0.6 watts, and consequently the power loss from the cathodes is low. The cathode-ray tubes used are electrostatic deflection tubes, to allow voltage control which has the advantage of low inertia, low power consumption and very short flyback time.

The horizontal indexing and vertical indexing devices 58 and 59, respectively, can be produced in the same way as those described in U.S. Pat. No. 4,333,105. The vertical-scan and horizontal-scan devices 56 and 57, respectively, compare the frequency of the vertical indexing and horizontal indexing signals supplied by the devices 59 and 58, respectively, with the frequency and phase of the clock signal at the frequency 10 $F_l$ and at the frequency 10 $F_L$. They correct the vertical scan and horizontal scan, in order to adjust accurately the frame alignment and linearity of the picture portion generated by the tube 60. A manual setting can be provided on the devices 56 and 57 to compensate for connection faults attributed to glass-making and fusing tolerances. In the vertical direction, the connection faults can be corrected by means of continuous adjustment of the position of each picture portion, since the phosphors consist of continuous vertical strips. In contrast, the connection faults on the horizontal edges of the tubes can be corrected only in terms of a whole number of picture points because of the discontinuous structure of the phosphors.

In this device, the use of cathode-ray tubes with indexing allows a high accuracy of reconstitution of the picture portions, thus making it possible to minimize connection faults between the picture portions.

The increase in the horizontal scanning speed by a factor of 10 makes it possible to increase the energy of the electron beam by a factor of 10, without saturating the phosphors, thus increasing the brightness of the displayed picture by a factor of 10.

The increase in the vertical scanning speed by a factor of 10, that is to say equal to the number of rows of tubes, makes it possible to increase the brightness by an additional factor of 10 and to display a field in 20 ms, that is to say the same period as the analysis, thus allowing good viewing of pictures having motion images.

Of course, if this last advantage is relinquished, it is possible to simplify the vertical scanning means by selecting a period of 20 ms, as in conventional monitors. In this case, the multiplier 47 is omitted from the block diagram. It is also possible to relinquish some of the increase in brightness, while at the same time preserving good viewing of pictures having motion images, by selecting a horizontal-scan period equal to 64 microseconds and a vertical-scan period of 2 ms. In this case, the multiplier 52 is omitted from the block diagram. This alternative form is advantageous because conventional cathode ray tubes, with magnetic vertical and horizontal deflection yokes can be used, thanks to the low horizontal scan frequency. These conventional tubes being mass-produced, their cost is lower than that of electrostatic tubes specially constructed for this use.

The invention is not limited to the exemplary embodiments described above. It is within the scope of a person skilled in the art to use other types of cathode-ray tubes, for example those incorporating 3 electron guns and a mask or possessing magnetic deflection means or scanned with an even higher vertical-scan frequency. It is also possible to use random-access memories and read them at a frequency different from the point analysis frequency.

It is possible, of course, to form a matrix with any number of beams and any number of tubes. If the matrix comprises N rows and M columns, it is necessary to select a vertical scanning speed at least equal to N times the speed of the vertical analysis scan, so as to have a display period which is no longer than the analysis period. On the other hand, if the horizontal scannig speed is selected equal to M times the speed of the horizontal analysis scan, the reading frequency is equal to the writing frequency in the memories 55, thus resulting in a simplification of the control means for the latter. Furthermore, any increase in the horizontal scanning speed makes it possible to increase the energy of the beam without saturating the phosphors.

The invention can be used in television monitors and receivers.

I claim:

1. A device for displaying a large-size television picture, comprising:
    a plurality of cathode-ray tubes placed next to one another to form a matrix of N rows and M columns (N and M being integers greater than 1), each cathode-ray tube containing at least one electron beam which displays a rectangular portion of the picture to be displayed on a luminescent screen;
    a plurality of optical devices located adjacent to the luminescent screens, each said optical device being associated with one luminescent screen, said optical devices acting to enlarge the picture portions displayed on the screens in such a manner that the enlarged picture portions appear contiguous in spite of joints between the cathode-ray tubes;
    a plurality of picture-portion memories, each said memory being associated with one cathode-ray tube and storing data corresponding to the picture portion displayed on the associated cathode-ray tube;
    means for controlling the memories; and
    scanning means to display each picture portion with a vertical scan having a period at least N times less than the period of a vertical analysis scan used to analyze an image to be displayed as said large-size television picture.

2. A device as claimed in claim 1, wherein the scanning means executes a horizontal scan with a period at least M times less than the period of a horizontal analysis scan used to analyze said image.

3. A device as claimed in claim 1, wherein the scanning means executes a vertical scan with a period N times less than the period of the vertical analysis scan, and a horizontal scan with a period M times less than the period of a horizontal analysis scan used to analyze said image.

4. A device as claimed in claim 1 for displaying a large-size color television picture, wherein:
    each electron beam is emitted by a single electron gun and produces three colors red, green and blue on said luminescent screen;
    each beam is deflected electrostatically by two pairs of deflection plates;
    the luminescent screens comprise color phosphors and indexing phosphors; and
    the scanning means comprises means for detecting light emitted by the indexing phosphors and means for generating indexing signals to be used in correcting variations in said vertical scan and a horizontal scan used to display each of said picture portions.

5. A device as claimed in claim 1, wherein envelopes of said plurality of cathode-ray tubes each have two vertical plane truncations, one on each side of the tube, each tube being fused to an adjacent tube along at least one of said plane truncations.

6. A device as claimed in claim 1, wherein the M cathode-ray tubes which form each row have a common envelope, the largest dimension of which is equal to the length of a line of the picture to be displayed, the N envelopes of the N rows being arranged parallel to one another and placed next to one another, each of said envelopes containing a plurality of parallel and coplanar electron guns provided with deflection devices, each said electron gun reproducing a corresponding rectangular portion of the picture to be displayed, the picture portions displayed by the electron guns in each envelope being aligned and made contiguous by adjusting a horizontal scan and said vertical scan used to display each of said picture portions.

* * * * *